(12) United States Patent
Roberts et al.

(10) Patent No.: US 6,683,257 B1
(45) Date of Patent: Jan. 27, 2004

(54) ATTACHMENT CLIP

(75) Inventors: Derek L. Roberts, Clarkston, MI (US); Dennis L. Arnold, Davison, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/272,924

(22) Filed: Oct. 17, 2002

(51) Int. Cl.[7] .................................................. F16L 3/00
(52) U.S. Cl. .......................................... 174/135; 248/73
(58) Field of Search ........................... 174/135, 40 CC, 174/72 A; 248/49, 73; 49/502

(56) References Cited

U.S. PATENT DOCUMENTS

| | | | | |
|---|---|---|---|---|
| 2,541,828 A | * | 2/1951 | Peck | 248/222.12 |
| 2,868,489 A | * | 1/1959 | Calcut | 248/229.26 |
| 3,807,675 A | * | 4/1974 | Seckerson et al. | 248/73 |
| 4,119,285 A | * | 10/1978 | Bisping et al. | 248/72 |
| 4,386,752 A | | 6/1983 | Pavlak et al. | 248/73 |
| 4,907,836 A | | 3/1990 | Ueda et al. | 276/39 |
| 5,615,851 A | | 4/1997 | LeBeau | 248/73 |
| 5,911,468 A | | 6/1999 | Le Du | 296/208 |
| 5,917,152 A | | 6/1999 | Kameyama | 174/72 |
| 6,119,406 A | | 9/2000 | Gulisano et al. | 49/502 |

* cited by examiner

*Primary Examiner*—Dean A. Reichard
*Assistant Examiner*—Adolfo Nino
(74) *Attorney, Agent, or Firm*—Rader, Fishman & Grauer PLLC

(57) ABSTRACT

An attachment clip includes an inner body portion and an outer body portion separated by a cavity, and a secondary spreader located between the cavity and a bottom of an elongated cavity. The secondary spreader is located along an axis passing through the cavity and the elongated cavity to increase the flexibility of the inner and outer body portions. The attachment clip is integrally formed of the same material with a substrate by using an injection molding process, or other similar process, thereby eliminating the need for additional fasteners to attach the attachment clip to the substrate.

6 Claims, 3 Drawing Sheets

ATTACHMENT CLIP

BACKGROUND OF THE INVENTION

1. Field of the Invention

The present invention relates to a clip for the fastening of an element to a trim panel, and in particular to an attachment clip for fastening a wiring harness to a substrate of a trim panel without the need for additional mechanical fasteners.

2. Description of the Related Art

In the automotive industry electrical conductors are commonly bundled into wiring harnesses. These wiring harnesses need to be attached to a vehicle panel, either to a plastic molded substrate or sheet metal. Clips and other types of clamps are used for this purpose. Once molded, the prior art clips require that the plastic molded substrate be trimmed to include apertures for receiving the clips in the plastic substrate. The plastic molded substrate must also have the proper thickness and specifications in order for the clips to be secured to the panel. Creating the proper apertures on the plastic molded substrate requires extra tooling and expense. The additional steps also create more opportunities for error to occur in the manufacturing and assembly stages.

Other prior art clips fasten directly to the sheet metal of the vehicle. The sheet metal, and the apertures for receiving the clips in the sheet metal, have to be stamped and cut to thicknesses and specifications which allow the clips to be easily and reliably secured to the panels. The location of the attachments on the sheet metal cannot be easily changed due to the complexity and expense of creating die stamps for stamping sheet metal.

In either case, the prior art clips require a relatively high insertion force to engage the clip to the plastic molded substrate or the sheet metal. In confined spaces of the vehicle, including areas within the door trim panel, it is sometimes difficult to provide the needed force to insert the clip in the vehicle panel. Hand room is also restricted adding further difficulties in engaging the clip to the vehicle panel. The clips can be relatively large themselves, and often times the required room for the clip is not available.

Further, the prior art clips have legs which extend down from the clip to engage the wiring harness to the vehicle panel. The clip legs are typically of the type which must be compressed together as they are squeezed though the vehicle panel apertures. The clip legs must be larger than the aperture to provide interference, and thus retention, after the clips legs are inserted through the aperture. If the aperture is not created within the tolerances allowed, very great insertion force may be needed, which could lead to deformation or breaking of the clip and possible injury to the assembler. Finally, the prior art clips typically are very difficult to remove after insertion and are therefore, as a practical matter, not reusable.

SUMMARY OF THE INVENTION

The inventors of the present invention have recognized these and other problems associated with wiring harness attachment clips for injection molded substrates. To this end, the inventors have developed an attachment clip comprising an inner body portion and an outer body portion forming a cavity and a secondary spreader. The inner body portion is defined by an inner undercut and an inner body lead-in joined together by an inner retention radius. Similarly, the outer body portion is defined an outer undercut and an outer body lead-in joined together by an outer retention radius. The cavity is defined by said inner undercut and said outer undercut. The secondary spreader portion is defined by a first radius and a second radius, wherein said first radius is positioned on a first wall and said second radius is positioned on a second wall. The attachment clip is integrally formed with a substrate by using an injection molding process, extrusion process, or the like, thereby eliminating the need for additional fasteners to attach the attachment clip to the substrate.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
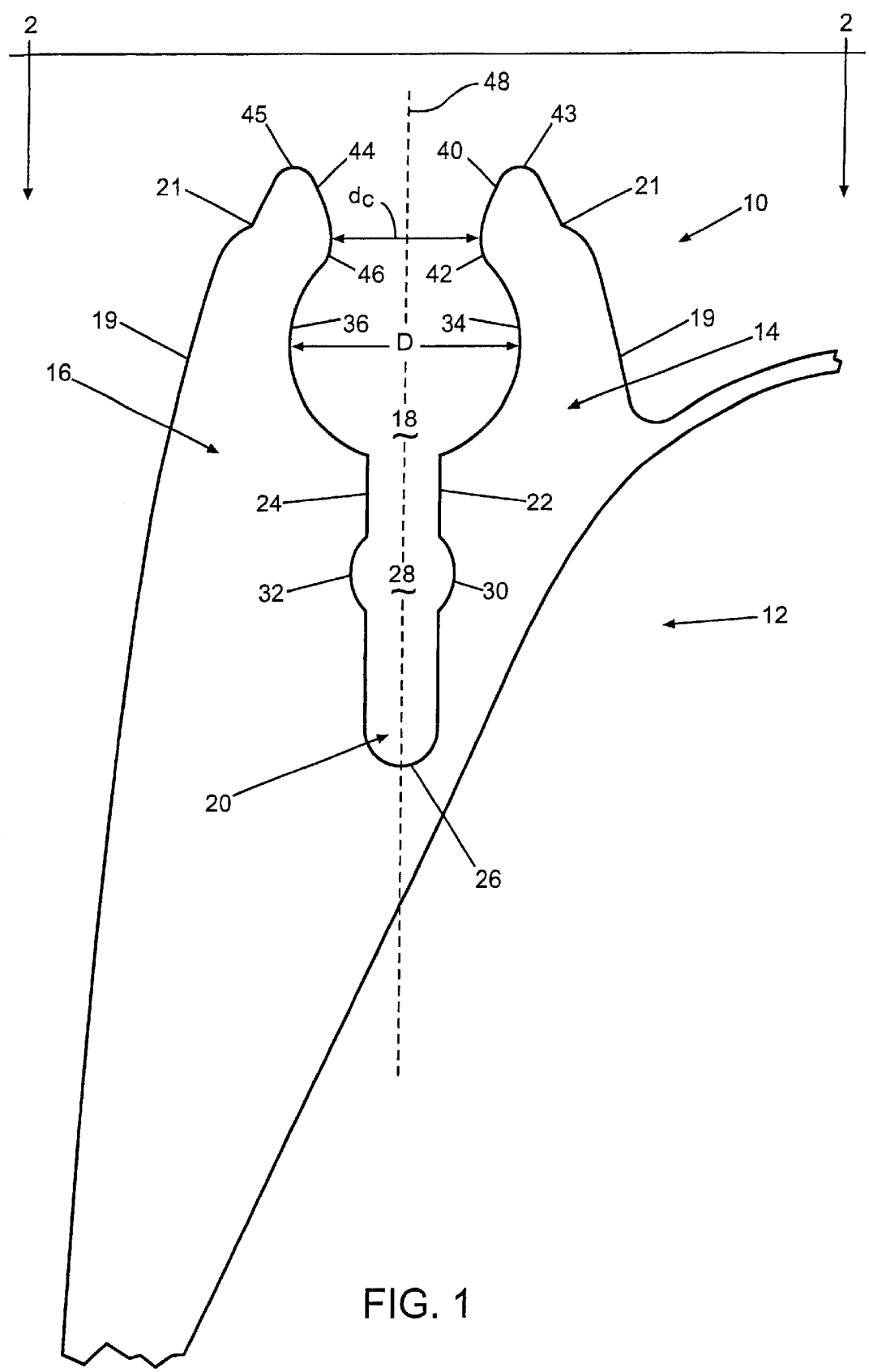
FIG. 1 is perspective view of an attachment clip according to the invention.

Referring now to FIG. 1, an attachment clip, shown generally at 10, is shown according to an embodiment of the invention. The attachment clip 10 is integrally formed with a substrate 12 by using an injection molding process, extrusion process, or the like, thereby eliminating the need for additional fasteners to attach the attachment clip to the substrate 12. The substrate 12 may be used to form a variety of structures. For example, the surface of the substrate 12 that is exposed to the viewer in FIG. 1 may form a "B" surface of a trim panel, such as a door panel, for a vehicle (not shown), and the backside of the substrate 12 that is not exposed may form an "A" surface of the trim panel.

In general, the attachment clip 10 comprises an inner body portion 14 and an outer body portion 16 forming a cavity 18 and a secondary spreader 28 therebetween. The inner body portion 14 includes an inner undercut 34 joined by an inner retention radius 42 to the inner body lead-in 40. The outer body portion 16 includes an outer undercut 36 joined by an outer retention radius 46 to the outer body lead-in 44. One purpose of the inner retention radius 42 and the outer retention radius 46 is to assist an injection mold tool 54 (FIG. 3) to properly eject without damaging the attachment clip 10 during the injection molding process, as described below. As seen in FIG. 1, the inner retention wall 34 of the inner body portion 14 and the outer retention wall 36 of the outer body portion 16 are generally curvilinear in shape to form the cavity 18 therebetween. In the illustrated embodiment, the inner body portion 14 and the outer body portion 16 are disposed symmetrically about a vertical axis 48 that passes through the center of the cavity 18. However, it will be appreciated that the inner and outer body portions 14, 16 may be disposed non-symmetrically about the vertical axis 48.

Figure 2:
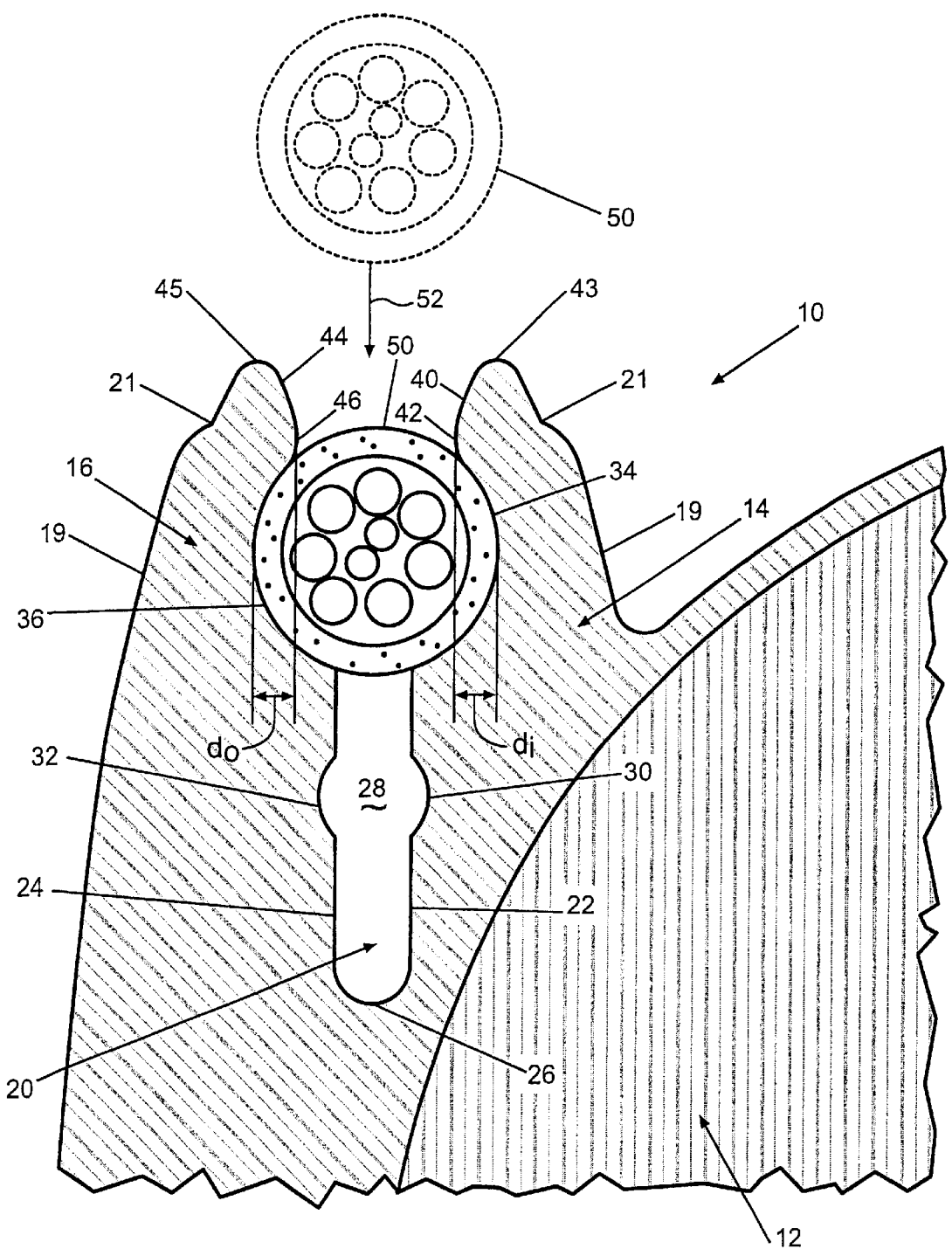
FIG. 2 is a cross-sectional view of the attachment clip taken along line 2—2 of FIG. 1.

Referring now to FIG. 2, the shape of the cavity 18 is such so as to allow an element 50, such as a wiring harness of a well-known type, to be positively secured within the cavity 18 of the attachment clip 10. It should be recognized that the shape of the cavity 18 can be any desired shape that substantially conforms to the shape of the element to be positively secured therein. For example, the cavity 18 can have any geometrical shape, such as a substantially square shape, rather than the substantially circular shape as shown in the illustrated embodiment, for positively securing an element 50 with a corresponding geometrical size and shape. However, the geometrical shape should be such that the injection mold tool 54 can still be removed without damaging the attachment clip 10.

To assist in positively securing the wiring harness 50 within the cavity 18, the attachment clip 10 includes an inner undercut 34 and an outer undercut 36. The purpose of the inner and outer undercuts 34, 36 is to ensure that the proper amount of retention force is exerted on the wiring harness 50 to positively secure the wiring harness 50 within the cavity 18 of the attachment clip 10. The inner undercut 34 is defined by a distance, $d_i$, between the inner retention radius 42 and the inner undercut 34 of the inner body portion 14. Similarly, the outer undercut 36 is defined by a distance, $d_o$, between the outer retention radius 46 and the outer undercut 36 of the outer body portion 16. In the illustrated embodiment, the distances, $d_i$ and $d_o$, are approximately equal to 1.68 mm. However, the distances, $d_i$ and $d_o$ can be different from each other. Further, the diameter, D, of the cavity 18 is approximately 10 mm to positively secure the wiring harness 50 having a corresponding size and shape. The dimensions stated only refer to the illustrated embodiment and do not limit the invention. The dimensions D, $d_i$ and $d_o$ depend on the size of the element 50 that is being positively secured.

The wiring harness 50 is positively secured by the attachment clip 10 by inserting the wiring harness 50 into the cavity 18 in the direction shown by the arrow 52. When inserting the wiring harness 50, the inner and outer body portions 14, 16 move away from each other by the force exerted by the wiring harness 50 on the attachment clip 10 (shown in phantom in FIG. 3). It has been found based on the material properties of the attachment clip 10 that the ratio, R, between the distances, $d_i$ and $d_o$, and the diameter, D, of the cavity 18 (R≈1.68/10.0≈0.17) allows for the inner and outer body portions 14, 16 to exhibit the proper flexibility when the wiring harness 50 is inserted, while exerting an adequate retention force to positively secure the wiring harness 50 within the cavity 18. It should be noted that the ratio, R, depends on the material properties and the dimensions, such as thickness, of the attachment clip 10.

When the wiring harness 50 (shown in phantom in FIG. 2) is inserted into the attachment clip 10 in the direction of the arrow 52, the wiring harness 50 first engages the inner and outer lead-ins 40, 44, which are angled inwardly to assist the insertion of the wiring harness 50. The lead-ins 40, 44 extend between the radii 42, 46 and the top surfaces 43, 45. As the wiring harness 50 is further inserted, the wiring harness 50 encounters the attachment clip 10 at the inner and outer retention radii 42, 46, which define the smallest clearance distance, $d_c$, encountered by the wiring harness 50. At this point in time during the insertion of the wiring harness 50, the force exerted by the wiring harness 50 on the attachment clip 10 is at a maximum, resulting in the maximum amount of flexibility needed by the attachment clip 10 (shown in phantom in FIG. 3) to accommodate the insertion of the wiring harness 50. After the wiring harness 50 passes the inner and outer retention walls 34, 36, the wiring harness can be further inserted into the cavity 18 until the wiring harness 50 (as shown by solid lines in FIG. 2) is completely inserted into the cavity 18. At this point, the inner and outer retention walls 34, 36 return substantially to their original position, as shown in FIG. 2. The shape of the inner and outer retention radii 42, 46 and the inner and outer undercuts 34, 36 provide the necessary retention to positively secure the wiring harness 50 in the cavity 18 of the attachment clip 10 without the need for any additional mechanical fasteners to attach the attachment clip 10 to the substrate 12.

The secondary spreader 28 is defined by a first radius and a second radius, wherein the first radius 30 is positioned on a first wall 22 and the second radius 32 is positioned on a second wall 24. The secondary spreader 28 is located between the cavity 18 and a bottom 26 of an elongated cavity 20. One purpose of the secondary spreader 28 is to assist the inner and outer retention walls 34, 36 to adequately flex to permit the injection mold tool 54 to be pulled in the direction of die-draw, as shown by the arrow 58 in FIG. 3. The radius 30, 32 further increases the flexibility of the inner and outer body portions 14, 16. It should be noted that the radius 30, 32 can be included on only one of the first or second walls 22, 24, or alternatively, can be completely eliminated from the design of the attachment clip 10.

Figure 3:
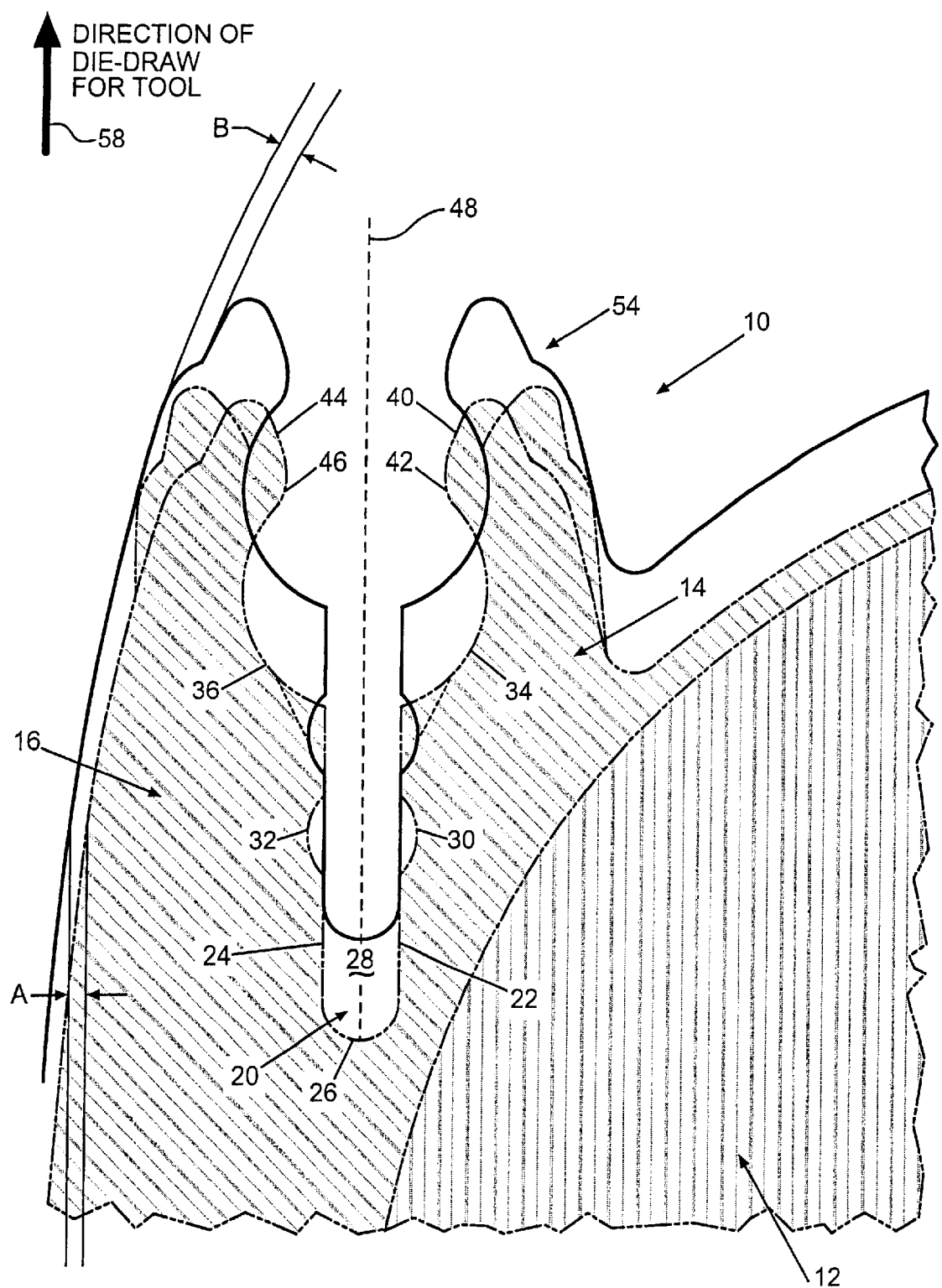
FIG. 3 is cross-sectional view similar to FIG. 2 showing an injection mold tool for a method of making the attachment clip of the invention.

Referring now to FIG. 3, the method of the invention includes integrally forming the attachment clip 10 with the substrate 12 by using an injection molding process, or the like. Specifically, the attachment clip 10 is integrally formed with the substrate 12 by using the tool 54 in an injection molding process. Once the tool 54 is properly positioned in the mold (not shown), the material used for forming the attachment clip 10 and the substrate 12 is injected into the mold using a well-known injection molding process. It should be noted that the material used in the method of the invention can be any suitable material with the desired properties to practice the invention. After a sufficient amount of time for the curing process, the mold and the tool 54 are pulled away from the attachment clip 10 and the substrate. To properly remove the attachment clip 10 from the injection mold tool 54, the outer surface 19 of the attachment clip 10 includes a clearance notch 21. The clearance notch 21 is located proximate to the top surfaces 43, 45. The clearance notch 21 defines a dimension, B, that should be larger than dimension A, so that the injection mold tool 54 can be properly removed from the attachment clip 10 during the manufacturing process. In addition to the clearance notch 21, the secondary spreader 20 allows the inner and outer retention walls 34, 36 to adequately flex when the injection mold tool 54 is pulled away from the attachment clip 10 in the direction of die-draw, as shown by the arrow 58 in FIG. 3. While the tool 54 is being pulled, the inner retention radius 42 and the outer retention radius 46 cause the inner and outer body portions 14, 16 to flex, as shown in phantom lines in FIG. 3. To allow the tool 54 to properly eject without damaging the attachment clip 10, dimension, A, should be less than dimension, B, so that the attachment clip 10 can fit within the injection mold tool 54. It will be appreciated that the invention is not limited by use of an injection molding process, and that the invention can be practiced by other suitable means for integrally forming the attachment clip 10 with the substrate 12, thereby eliminating the need for additional mechanical fasteners to attach the attachment clip 10 to the substrate 12.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. An attachment clip, comprising:

an inner body portion and an outer body portion, said inner and said outer body portions defining a cavity therebetween, and a secondary spreader located between said cavity and a bottom of an elongated cavity, wherein said secondary spreader is located along an axis passing through said cavity and said elongated cavity to increase a flexibility of said inner and outer body portions.

2. The attachment clip as in claim 1, wherein said secondary spreader is defined by a first radius and a second radius, wherein said first radius is positioned on a first wall and said second radius is positioned on a second wall.

3. The attachment clip as in claim 1, wherein said cavity is defined by an inner undercut and an outer undercut.

4. The attachment clip as in claim 1, wherein said inner body portion includes said inner undercut and an inner body lead-in joined together by an inner retention radius, and wherein said outer body portion includes said outer undercut and an outer body lead-in joined together by an outer retention radius.

5. An attachment clip, comprising:

an inner body portion, an outer body portion and a substrate, said inner and said outer body portions defining a cavity therebetween, and a secondary spreader located between said cavity and a bottom of an elongated cavity, wherein said secondary spreader is located along an axis passing through said cavity and said elongated cavity to increase a flexibility of said inner and outer body portions, and wherein said inner body portion, said outer body portion and said substrate are integrally formed.

6. A method of manufacturing an attachment clip comprising;

integrally forming an attachment clip with a substrate, whereby said attachment clip and said substrate are integrally formed by using an injection mold tool during an injection molding process, and whereby said attachment clip includes a secondary spreader wherein said attachment clip adequately flexes when the injection mold tool is pulled away from said attachment clip during said injection molding process.

* * * * *